United States Patent
Pinto

(10) Patent No.: US 12,223,553 B2
(45) Date of Patent: Feb. 11, 2025

(54) SYSTEMS AND METHODS FOR PROVIDING ACCESS TO REPRESENTATIONS OF COMPUTING EVENTS

(71) Applicant: The Toronto-Dominion Bank, Toronto (CA)

(72) Inventor: Lamar Kyle Pinto, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/178,914

(22) Filed: Mar. 6, 2023

(65) Prior Publication Data

US 2024/0303749 A1   Sep. 12, 2024

(51) Int. Cl.
G06Q 40/12   (2023.01)

(52) U.S. Cl.
CPC .................. *G06Q 40/123* (2013.12)

(58) Field of Classification Search
CPC .................................................. G06Q 40/123
USPC ...................................................... 705/31–45
See application file for complete search history.

(56) References Cited

U.S. PATENT DOCUMENTS

| | | | |
|---|---|---|---|
| 7,395,230 B2 * | 7/2008 | Hermreck | G06Q 40/123 705/30 |
| 7,900,298 B1 | 3/2011 | Char et al. | |
| 8,694,395 B2 | 4/2014 | Houseworth et al. | |
| 2002/0133410 A1 | 9/2002 | Hermreck et al. | |
| 2005/0109840 A1 | 5/2005 | Walker, Jr. et al. | |
| 2010/0191587 A1 * | 7/2010 | Duerr | G06Q 20/04 705/37 |
| 2014/0164275 A1 | 6/2014 | Lee | |
| 2015/0046304 A1 * | 2/2015 | Bondesen | G06Q 40/10 705/31 |
| 2015/0142688 A1 | 5/2015 | Jackson et al. | |
| 2016/0292753 A1 | 10/2016 | Fuller et al. | |
| 2022/0215443 A1 | 7/2022 | Soderstrom | |

OTHER PUBLICATIONS

Easily Track Charitable Donations With Help from Eno; Published in Capital One; https://www.capitalone.com/learn-grow/money-management/charitable-donations-eno/; Mar. 29, 2021.

* cited by examiner

*Primary Examiner* — Robert R Niquette
(74) *Attorney, Agent, or Firm* — Rowand LLP; Peter Eschlboeck

(57) ABSTRACT

Methods and computer systems for providing access providing access to representations of computing events. Identifying, from a plurality of computing events, a set of computing events corresponding to a computing event category. The identification of the set of computing events including identifying a respective first category of each particular computing event in the set of computing events; and determining that each respective first category matches with a respective category defined in a list of categories maintained by a third-party server. Transmitting, to a computing device associated with a second category of a particular computing event of the set of computing events, an interface providing access to representations of computing events in the set of computing events.

20 Claims, 9 Drawing Sheets

SYSTEMS AND METHODS FOR PROVIDING ACCESS TO REPRESENTATIONS OF COMPUTING EVENTS

FIELD

The present disclosure relates to computing events and, more particularly, to systems and methods for providing access to representations of computing events.

BACKGROUND

Computing events are often tracked by computing systems. Sometimes a computer system may be unable to identify relevant computing events and provide representations of those computing events.

It would be advantageous to provide for enhanced identification of computing events and enhanced access to representations of computing events.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF EXAMPLE EMBODIMENTS

Figure 1:
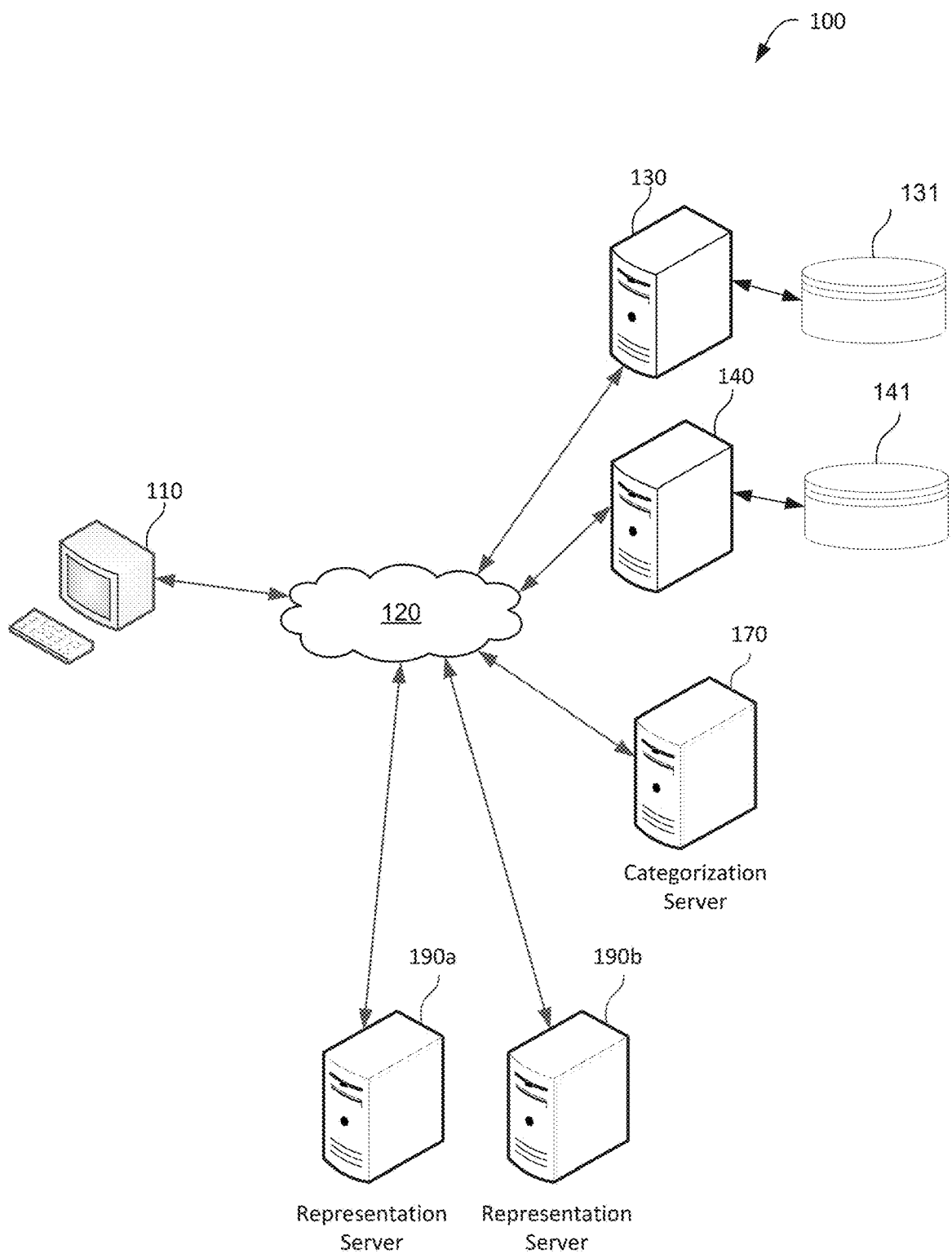
FIG. 1 shows a schematic diagram illustrating an operating environment of an example embodiment according to the subject matter of the present application.

In one embodiment, the present application describes a computer system. The computer system may include a communications module; a processor coupled to the communications module; and a memory coupled to the processor. The memory may store instructions that, when executed by the computer system, cause the computer system to identify, from a plurality of computing events, a set of computing events corresponding to a computing event category, the identification of the set of computing events including: identifying a respective first category of each particular computing event in the set of computing events; and determining that each respective first category matches with a respective category defined in a list of categories maintained by a third-party server. The instructions may further cause the system to transmit, via the communications module and to a computing device associated with a second category of a particular computing event of the set of computing events, an interface providing access to representations of computing events in the set of computing events.

In some implementations, the instructions may further cause the computer system to: identify a computing event correlated to the set of computing events, the computing event occurring after the set of computing events; and in response to identifying the computing event, transmit a recommendation of an action to be performed.

In some implementations, the instructions may further cause the computer system to: identify a computing event associated with the set of computing events, the computing event occurring after the set of computing events and identifying an amount; determine a portion of the amount attributable to the set of computing events; and provide on the interface a selectable option to provide a handling instruction for handling the portion of the amount attributable to the set of computing events.

In some implementations, the handling instruction may include an instruction to perform a data transfer to an entity defined by a category in the list of categories.

In some implementations, the instructions may further cause the computer system to retrieve a representation of a computing event of the set of computing events from an external system associated with the computing event.

In some implementations, the plurality of computing events may include computing events that occurred on a computing system distinct from the computer system.

In some implementations, the instructions may further cause the computer system to transmit, to the computing device, an interface including a selectable option to retrieve representations of computing events corresponding to the computing event category over a defined period of time.

In some implementations, the defined period may be a calendar or fiscal year prior to a current calendar or fiscal year.

In some implementations, the instructions may further cause the computer system to: calculate, based on the set of computing events and a defined period of time, a metric; and include the metric in the interface.

In some implementations, identifying the set of computing events may include downloading, from the third-party server, a bulk data file including the list of categories.

In some implementations, determining that each respective first category matches with the respective category defined in the list of categories maintained by the third-party server may include using an application programming interface to query the third-party server.

In some implementations, the set of computing events may include an action taken by the computing system.

In some implementations, the set of computing events may include a data transfer event.

In some implementations, the list of categories may include a list of entities.

In another aspect, present application describes a computer-implemented method. The computer-implemented method may include identifying, from a plurality of computing events, a set of computing events corresponding to a computing event category, the identification of the set of computing events including: identifying a respective first category of each particular computing event in the set of computing events; and determining that each respective first category matches with a respective category defined in a list of categories maintained by a third-party server. The method may further include transmitting, to a computing device associated with a second category of a particular computing event of the set of computing events, an interface providing access to representations of computing events in the set of computing events.

In yet another aspect, present application describes a non-transitory computer-readable storage medium comprising processor-executable instructions which, when executed, may configure a processor to identify, from a plurality of computing events, a set of computing events corresponding to a computing event category, the identification of the set of computing events including: identifying a respective first category of each particular computing event in the set of computing events; and determining that each respective first category matches with a respective category defined in a list of categories maintained by a third-party server. The instructions may further configure the processor to transmit, to a computing device associated with a second category of a particular computing event of the set of computing events, an interface providing access to representations of computing events in the set of computing events.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any subcombination, or all of the elements, without necessarily excluding any additional elements, and without necessarily requiring all of the elements.

In the present application, reference is made to a "computing event". In some embodiments, a computing event may be an event that occurs internal to one or more computing systems. A computing event may include one or more operations performed by a computing system.

The term "real-time", "near real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs.

Some of the embodiments described herein focus on a transfer message that is provided as either a payment or request for payment. However, it is understood that the present application is not limited to any such embodiments and that the embodiments described with respect to a particular type of transfer generally may be extended to other types of transfers.

Example embodiments of the present application are not limited to any particular operating system, system architecture, mobile device architecture, server architecture, or computer programming language.

FIG. 1 shows a schematic diagram illustrating an operating environment of an example embodiment. The operating environment in this example includes a remote client device 110, first system 130, second system 140, categorization server 170 and representation servers 190. In some embodiments, the operating environment may include one or more client devices or a plurality of client devices, which may include the remote client device 110.

As illustrated, the first system 130 may provide a front-end interface which allows the client device 110 to interact with the first system 130. For example, the first system 130 may provide one or more graphical user interfaces (GUIs) to the client device 110. By way of example, the first system 130 may provide, to the client device 110, a user interface for providing access to a representation of a computing event.

The first system 130 may be configured to authenticate the client device 110 as being associated with a particular account. More particularly, the first system 130 may authenticate the client device 110 as being associated with an account in the data store 131. Authentication may be performed based on one or more credential such as, for example, a password, username, PIN, fingerprint, etc.

The first system 130 may be managed, operated, and/or controlled by an entity that may be an agent of a first account holder and may be a financial institution, such as a bank. The first account holder may be a customer (e.g. a corporate/business customer) or client of the entity or otherwise associated with the entity. In some embodiments, the first account holder is a transferor of a donation to a charity.

The first system 130 may store data regarding a mapping of an identifier associated with a recipient (e.g. a recipient or account identifier) to an identifier of the representation servers 190 (e.g. an Internet Protocol (IP) address or domain name). The mapping may be stored in data store 131.

The first system 130 may store data regarding one or more computing events in a plurality of respective computing event objects. The first system 130 may further store data regarding users or customers associated with the first system 130 in a plurality of respective user account objects representing respective user accounts. The data may be stored in data store 131.

The first system 130 may be configured to automatically track and identify computing events that meet certain criteria. For example, the system may track computing events over a defined time period. In some embodiments, the first system 130 may identify data transfers associated with registered charities.

The first system 130 may transmit a message to a system associated with a data transfer, for example, the second system 140, categorization server 170 and/or representation servers 190.

As illustrated, the first system 130 is in communication with the second system 140, categorization server 170 and/or representation servers 190 via the network 120. The first system 130 may be configured to transmit to the second system 140 a message, for example, a transfer message. The second system 140 may be further configured to receive a transfer message from the first system 130. The first system 130 may also be configured to transmit to the categorization server 170 a message, for example, a request for categorization data. The categorization server 170 may be further configured to receive a categorization data request from the first system 130.

The second system 140 may be managed, operated, and/or controlled by an entity that may be an agent of a second account holder and may be a financial institution, such as a bank. The second account holder may be a customer (e.g. a corporate/business customer) or client of the entity or otherwise associated with the entity. In some embodiments, the second account holder may, for example, be a recipient of a transfer from the first account holder. In some embodiments, the second account holder may be a charity and the transfer may represent a donation from the first account holder to the charity.

The second system 140 may store data regarding one or more computing events in a plurality of respective computing event objects. The second system 140 may further store data regarding users or customers associated with the second system 140 in a plurality of respective user account objects representing respective user accounts. The data may be stored in data store 141.

The first system 130 and second system 140 may be or include transfer processing systems. A transfer processing system may include a transfer processing module implemented as a software module and configured to process transfers such as transfers identified in transfer messages. By way of example, a processing module or system included in the first system 130 may be configured to perform internal transfers by transferring value between two different records in the data store 131 (i.e., between two accounts at the same financial institution) and/or to perform external transfers by interacting with the second system 140 or third party systems. For example, external transfers may be performed using various transfer methods or protocols. In some implementations, at least some transfers may be performed by interacting with other financial institution systems via a SWIFT (Society for Worldwide Interbank Financial Telecommunication) network. A transfer may be successfully processed and completed when value/resources have been successfully transferred from a transferor account to a recipient account. The processing system may track and store data identifying completed transfers.

The categorization server 170 may be managed, operated, and/or controlled by a third-party that is independent of the first and second account holders. The categorization server 170 may be, for example, a government managed, operated, or controlled server. The categorization server 170 may store data regarding categories of computing events in a categories object. In some embodiments, the data may represent a list of entities that are registered with a government. The list of entities may be, for example, a list of registered charities.

In some embodiments, the representation servers 190 may be managed, operated, and/or controlled by entities that are recipients of transfers. In particular, each of the representation servers 190 may be associated with respective charities.

The client device 110, first system 130, second system 140, categorization server 170 and representation servers 190 may be configured to ingest data from each other and may transmit requests, replies, alerts, notifications, configuration objects, or other data to each other.

The first system 130 and the second system 140 may store data in respective data stores 131 and 141. The data stores 131 and 141 are illustrated as single units for ease of illustration, but may include a plurality of storage units and, in some cases, storage media connected via the network 120.

As illustrated, the client device 110 is in communication with a first system 130 via a network 120. In some embodiments, the client device 110 may be managed, operated or controlled by the first account holder.

The client device 110 is a computing device and may be configured to receive input. It may, as illustrated, be a desktop computer. However, the client device 110 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The first system 130, second system 140, categorization server 170 and representation servers 190 are or include a computer system such as a computer server system or a database management system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The client device 110, first system 130, second system 140, categorization server 170 and representation servers 190 may be in geographically disparate locations.

The network 120 is a computer network. The network 120 may be an internetwork such as may be formed of one or more interconnected computer networks. For example, such a network may be or may include an Ethernet network, an asynchronous transfer mode (ATM) network, a wireless network, or the like. In some implementations, the network 120 may be the Internet. The network 120 allows the client device 110, first system 130, second system 140, categorization server 170 and representation servers 190 to communicate with one another.

As further described below, the client device 110, first system 130, second system 140, categorization server 170 and representation servers 190 may be configured with software to perform associated functions such as those described herein.

FIG. 1 illustrates the first system 130, second system 140, categorization server 170, representation servers 190, and data stores 131 and 141 as separate and distinct computing devices. However, these systems may not be separate physical systems. For example, the first system 130 and the data store 131 may be implemented on a common physical device. As another example, the second system 140 and the data store 141 may be implemented on a common physical device. As yet another example, the first system 130 and second system 140 may be implemented in software associated with a common processor. As yet a further example, the data stores 131 and 141 may be included in the first system 130 and second system 140, respectively, or may be external to those systems.

Figure 2:
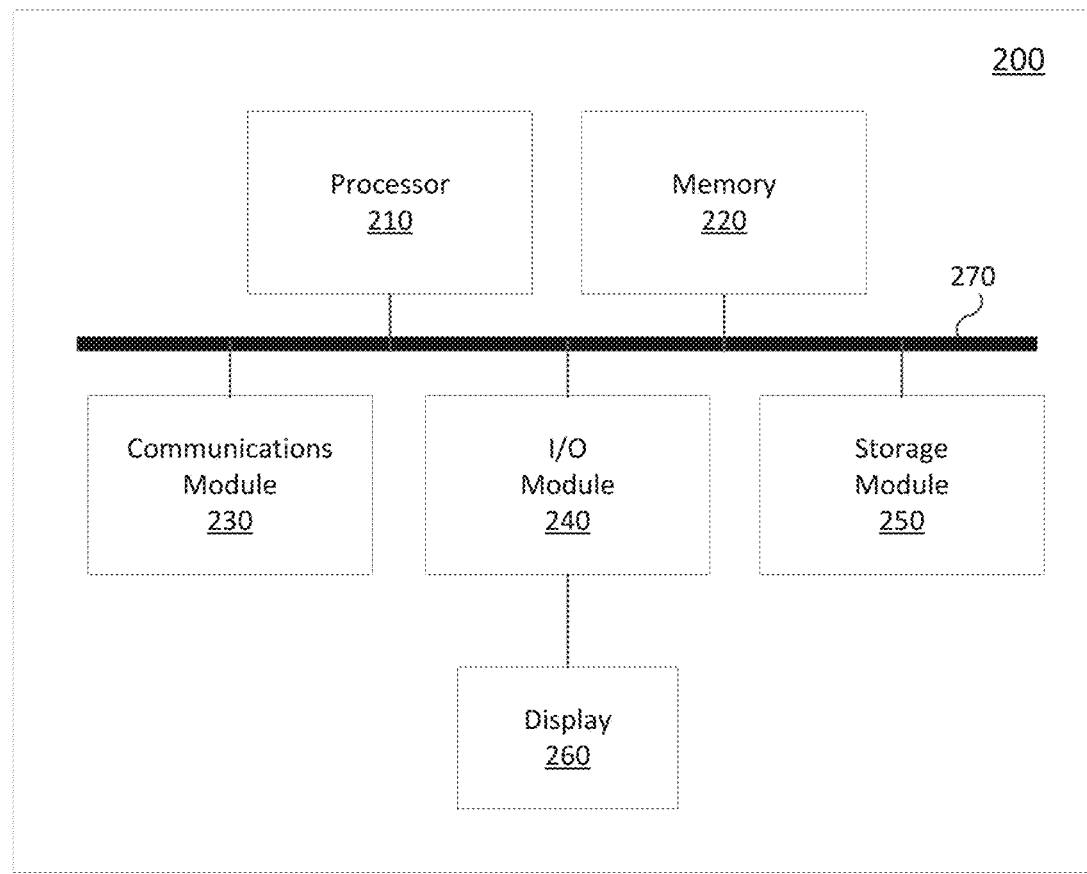
FIG. 2 shows a high-level schematic diagram of the client device of FIG. 1.

An example embodiment of the client device 110 will now be discussed with reference to FIG. 2. FIG. 2 is a high-level schematic diagram of the client device 110. The client device 110 may, in some embodiments, be a personal computer as shown in FIG. 1.

The client device 110 includes a variety of modules. For example, as illustrated, the example computing device 200 may include a processor 210, a memory 220, a communications module 230, an I/O module 240, and/or a storage module 250. As illustrated, the foregoing example modules of the example computing device 200 are in communication over a bus 270. As such, the bus 270 may be considered to couple the various modules of the client device 110 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the client device 110.

The communications module 230 allows the client device 110 to communicate with other computing devices and/or various communications networks such as, for example, the network 120. For example, the communications module 230 may allow the client device 110 to send or receive communications signals. Communications signals may be sent or received according to one or more protocols or according to one or more standards. The communications module 230 may allow the client device 110 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the client device 110 to communicate using near-field communication (NFC), via Wi-Fi™, using Bluetooth™ or via some combination of one or more networks or protocols. In some embodiments, all or a portion of the communications module 230 may be integrated into a component of the client device 110. For example, the communications module 230 may be integrated into a communications chipset.

The I/O module 240 is an input/output module. The I/O module 240 allows the client device 110 to receive input from and/or to provide input to components of the client device 110 such as, for example, various input modules and output modules. For example, the I/O module 240 may, as shown, allow the client device 110 to receive input from and/or provide output to the display 260.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

The client device 110 may include or be connected to a display 260. The display 260 is a module of the client device 110. The display 260 is for presenting graphics. The display 260 may be, for example, a liquid crystal display (LCD). In addition to being an output device, the display 260 may also be an input device. For example, the display 260 may allow touch input to be provided to the client device 110. In other words, the display 260 may be a touch sensitive display module. In a particular example, the display 260 may be a capacitive touch screen.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
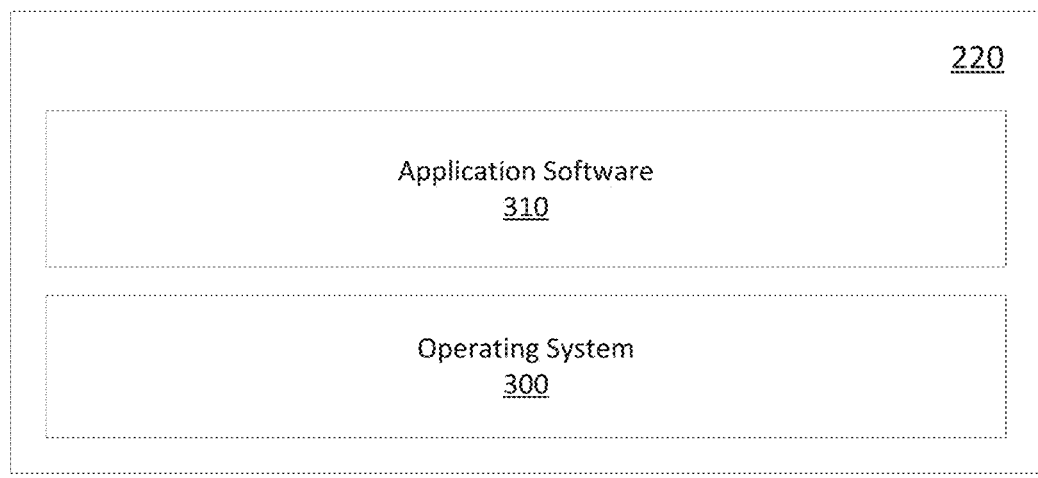
FIG. 3 shows a simplified organization of software components stored in a memory of the client device of FIG. 2.

FIG. 3 depicts a simplified organization of software components stored in the memory 220 of the client device 110. As illustrated, these software components include an operating system 300 and an application software 310.

The operating system 300 is software. The operating system 300 allows the application software 310 to access the processor 210 (FIG. 3), the memory 220, the communications module 230, the I/O module 240, and the storage module 250 of the client device 110. The operating system 300 may be, for example, Google™ Android™, Apple™ iOS™, UNIX™, Linux™, Microsoft™ Windows™, Apple OSX™ or the like.

The application software 310 adapts the client device 110, in combination with the operating system 300, to operate as a device for facilitating data transfers.

As noted above, the first system 130, second system 140, categorization server 170 and representation servers 190 are or include a computer system. An example computer system 400 will now be discussed with reference to FIGS. 4 and 5. Suitably-configured instances of the example computer system 400 may, in some embodiments, serve as and/or be a part of the first system 130, second system 140, categorization server 170 and/or representation servers 190.

Figure 4:
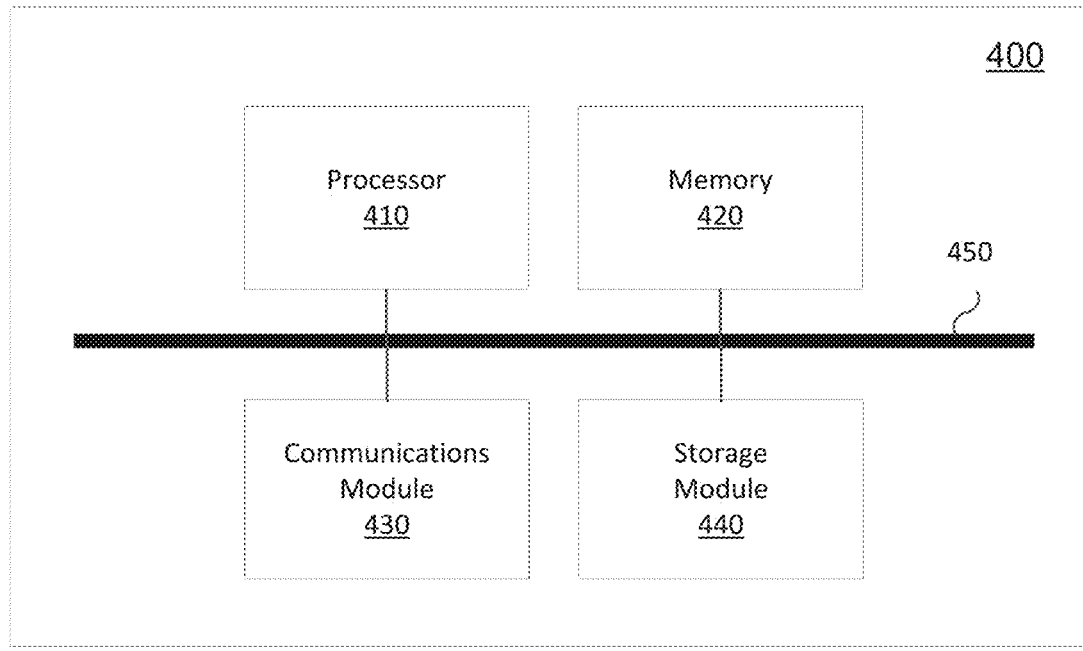
FIG. 4 shows a high-level schematic diagram of an example embodiment of the transferor, recipient, and rescheduling computing systems of FIG. 1.

FIG. 4 is a high-level schematic diagram of an example computer system 400.

The example computer system 400 includes a variety of modules. For example, as illustrated, the example computer system 400 may include a processor 410, a memory 420, a communications module 430, and/or a storage module 440. As illustrated, the foregoing example modules of the example computer system 400 are in communication over a bus 450. As such, the bus 450 may be considered to couple the various modules of the example computer system 400 to each other, including, for example, to the processor 410.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 400.

The communications module 430 allows the example computer system 400 to communicate with other computing devices and/or various communications networks such as, for example, the network 120. The communications module 430 may allow the example computer system 400 to send or receive communications signals. Communications signals may be sent or received according to one or more protocols or according to one or more standards. For example, the communications module 430 may allow the example computer system 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 430 may allow the example computer system 400 to communicate via Wi-Fi™, using Bluetooth™ or via some combination of one or more networks or protocols. In some embodiments, all or a portion of the communications module 430 may be integrated into a component of the example computer system 400. For example, the communications module may be integrated into a communications chipset.

The storage module 440 allows the example computer system 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
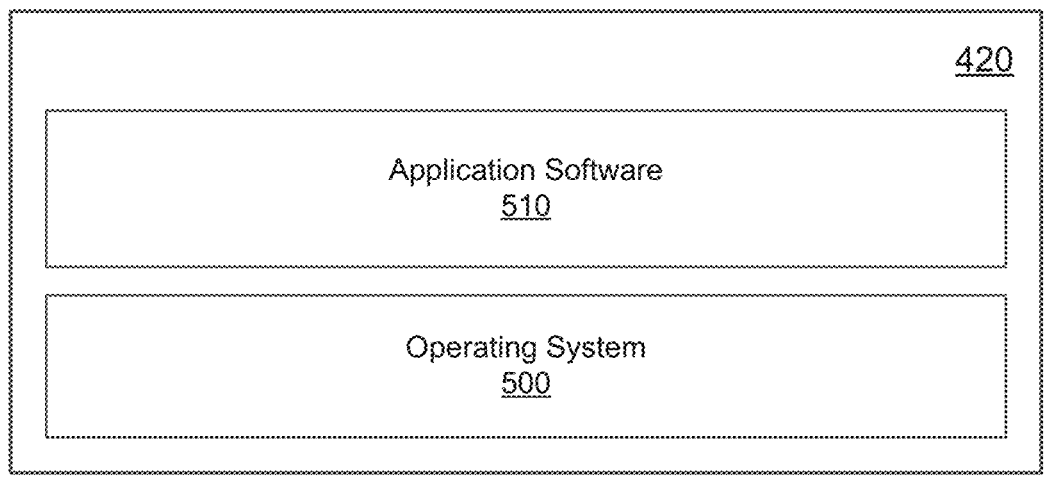
FIG. 5 shows a simplified organization of software components stored in the example computing systems of FIG. 4.

FIG. 5 depicts a simplified organization of software components stored in the memory 420 of the example computer system 400. As illustrated, these software components include an operating system 500 and an application software 510.

The operating system 500 is software. The operating system 500 allows the application software 510 to access the processor 410, the memory 420, the communications module 430, and the storage module 440 of the example computer system 400. The operating system 500 may be, for example, UNIX™, Linux™, Microsoft™ Windows™, Apple OSX™ or the like.

The application software 510, when executed, co-operates with the operating system 500 to adapt the example computer system 400 for some purpose and to provide some defined functionality. For example, the application software 510 may cooperate with the operating system 500 to adapt a suitable embodiment of the example computer system 400 to serve as the first system 130, second system 140, categorization server 170 and/or representation servers 190.

Figure 6:
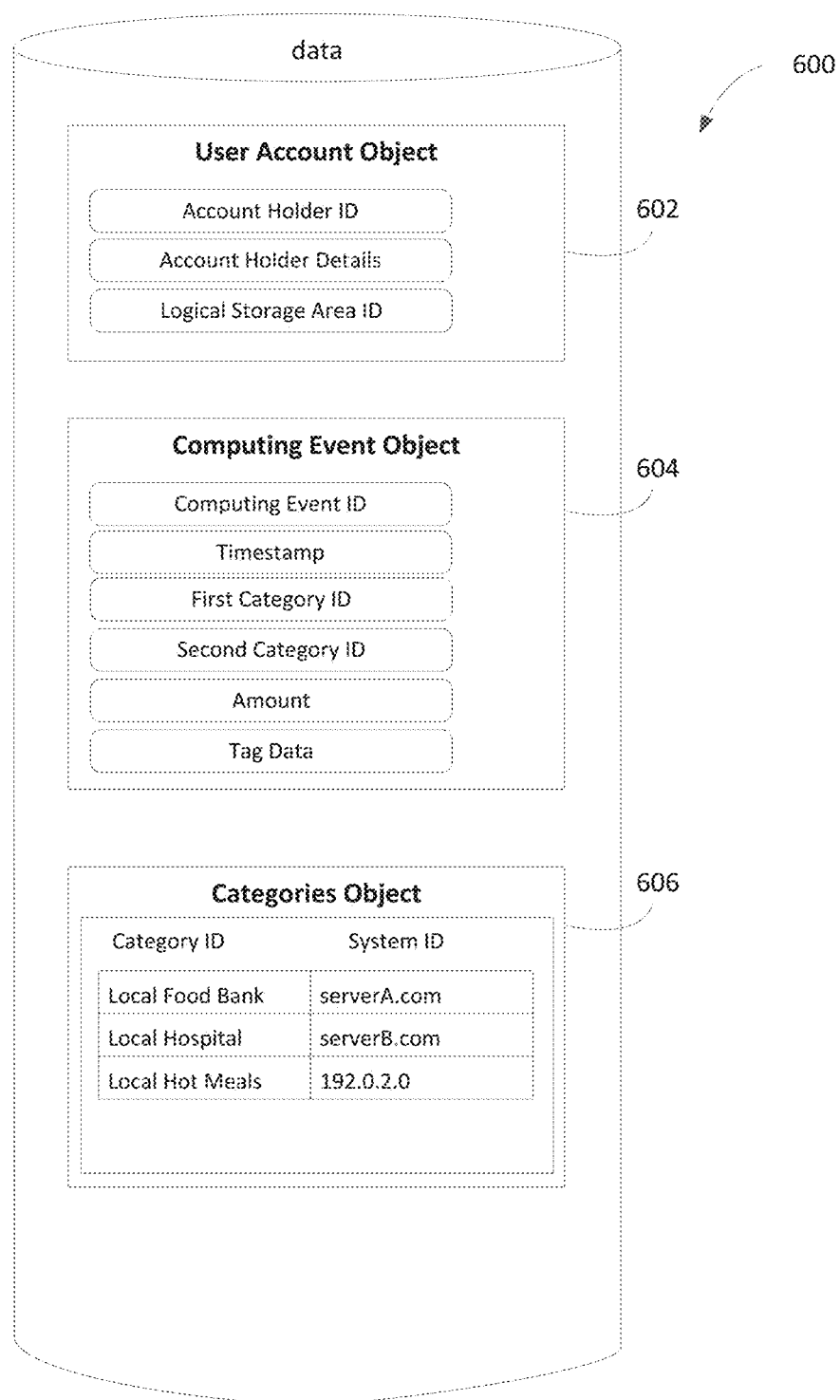
FIG. 6 shows, in block diagram form, an example embodiment of a data store of FIG. 1.

Reference is now made to FIG. 6, which partially illustrates an example data store 600 in block diagram form. The data store may be a data store 131 of the first system 130 of FIG. 1 and/or a data store 141 of the second system 140 of FIG. 1. Not all components of the data store 600 are illustrated. The data store 600 may include one or more data storage units. In some cases, the stored data may be in a database format and may include one or more databases. The databases may be relational databases in some examples. The data store may store data regarding one or more user account objects 602, computing event objects 604, and categories objects 606. Each of the objects 602, 604 and 606 may be a data structure.

The data store 600 may store data regarding an account holder in a user account object 602. A user account object 602 may also include details regarding an individual or entity holding an account or other logical storage area. Example details include an account holder identifier indicating a particular person or entity, identification information (e.g. first and last name), an alias (e.g. email address, phone number), contact information (e.g. home address), and sign in or authentication credentials (e.g. user name, password, access card number). In some embodiments, the account holder may be or represent a user, transferor, recipient, payor, payee, or customer.

A user account object 602 may be associated with a logical storage area. A logical storage area may be or include an area of the data store 600. A logical storage area may further be or represent a bank account or other logical storage area for storing a quantity of a resource. In some embodiments, the data store 600 may include a database of customer accounts and bank accounts at a particular financial institution.

A user account object 602 may also include one or more identifiers that may link to one or more respective logical storage areas. For example, a user account object 602 may include a logical storage area identifier indicating a logical storage area that is associated with an account holder.

The data store 600 may further store data regarding a computing event in a computing event object 604. The computing event object 604 may be a data structure and may contain details or parameters regarding a computing event. In some embodiments, the computing event object 604 corresponds to an entry in a log file.

Example parameters that may be included in a computing event object include an identifier identifying the particular computing event, a timestamp, one or more identifiers identifying one or more categories of the computing event, an amount, and tag data. The timestamp may identify when the computing event occurred and may be a date and time of day. The tag data may be generated by a computer system based on first and/or second categories of the computing event object and may identify the computing event as falling within a particular computing event category.

In some embodiments, for example where the computing event corresponds to or represents a transfer, the computing event identifier may identify a particular data transfer, the timestamp may identify a date on which the data transfer occurred, the first category field may identify a transferor of the data transfer, the second category field may identify a recipient of the data transfer, and the amount may represent an amount of resources transferred. The parameters may include: identification information of the first and/or second account holders (e.g. full name, postal address, contact details, telephone number, email address, alias); and routing data, which may include identification information of the first and/or second system and/or the entity associated with, operating or managing the first and/or second system (e.g. a routing number, financial institution identifier, and/or branch transit number associated with the first and/or second system) and/or identification information of a first and/or second logical storage area, for example, a logical storage area identifier (e.g. bank account number), associated with, managed or controlled by a respective first and/or second account holder to or from which the amount of resources was transferred. The parameters may be or include numeric and/or alphanumeric values.

The data store 600 may further store data regarding a list of possible predefined categories in a categories object 606. The categories object 606 may include a plurality of defined categories that may be used by the first computing system 130 to identify relevant computing events and to lookup a system identifier corresponding to a particular computing event category. In some embodiments, where a computing event represents a transfer, the each category may represent a particular recipient entity. In some embodiments, a category may be or correspond to a recipient identifier. A recipient identifier may include, for example, a recipient name (e.g. "Local Food Bank") and/or address of the recipient.

A system identifier may be included in the list of supported charities. In this way, the categories object 606 may include a plurality of mapping definitions in a lookup table. A mapping definition may be defined by specifying a mapping of a category of a request to a system identifier included in the categories object 606. By way of example, a lookup table may include associations such as: requests for representations of transfers to "Local Food Bank" are routed to "serverA.com"; requests for representations of transfers to "Local Hospital" are routed to "serverB.com"; and requests for representations of transfers to "Local Hot Meals" are routed to "192.0.2.0". In other words, the system identifiers may be used for retrieving representations of computing events.

The first system 130 and second system 140 illustrated in FIG. 1 may store one or more user account objects 602, computing event objects 604, and categories objects 606 in a data store 131 and/or 141.

Figure 7:
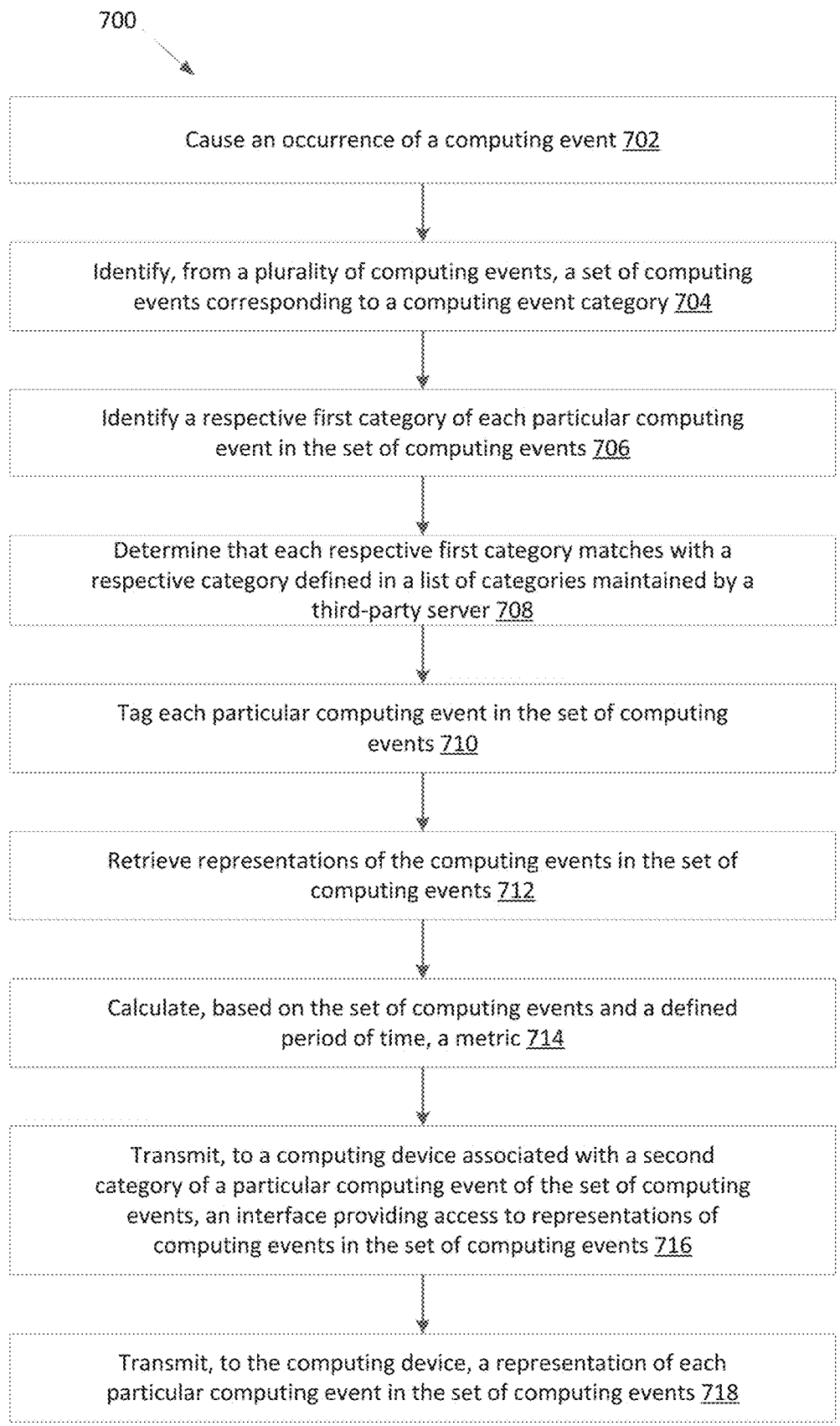
FIG. 7 is a flowchart showing operations performed in providing access to representations of computing events, according to an example embodiment.

Reference will now be made to FIG. 7 which illustrates an example method 700 for providing access to representations of computing events. The operations of the example method 700 may be performed by a computer system which may be of the type described herein. In some embodiments, the operations may be performed by a first computing system 130 of FIG. 1.

In operation 702, the computing system causes a computing event to occur. The computing event may include a transfer event. An example of a transfer event may include processing a transfer. The transfer may represent a transfer of value from one account to another. The amount of value may be expressed, for example, in a particular currency, a currency identifier, and/or other information.

The computing system may cause a transfer event to occur by, for example, processing a transfer message, which may be a computer-readable message configured for transmission over one or more computer networks between a sending device and a receiving device. The transfer message may be a structured message having a defined schema or set of predefined fields to contain data. The transfer message may be used to transfer resources from one entity to another entity. In particular, the transfer message may be used to effect a change in recorded ownership of resources. The resources may be currency, physical assets, credits, tokenized items like non-fungible tokens, computing resources such as memory allocated or processor time, access rights, or any other resource that may be owned or credited to an account associated with an account holder. In many of the examples herein, monetary resources may be referenced to illustrate concepts, but the present application is not necessarily solely applicable to financial or monetary instruments or resources.

The transfer message is specially formatted to include parameters of a transfer. The parameters may be included as metadata in the transfer message. Where the request to transfer is an ISO20022 message, the parameters may be included in an ISO20022 format. The parameters may include resource definition data. By way of example, the resource definition data may define a resource that is stored in or otherwise associated with a record associated with a transferor or recipient. The resource may be, for example, a computing resource. In another implementation, the resource may be data. In some implementations, the resource may represent an amount of value, such as a quantity of a currency.

The transfer message may, in some implementations, be or represent a payment. Such a message may be referred to as a payment message. In such implementations, the transfer rail may be a payment rail such as a real time payment rail and the database management systems may be a financial institution system. In at least some such implementations, the records may represent bank accounts and a transfer may be a request to transfer value from a sender bank account to the recipient bank account. The transfer message may be sent from a first financial institution system, which is associated with a first financial institution, to a second financial institution system, which is associated with a second financial institution.

The transfer message may, in some implementations, be or include a request to transfer. A request to transfer may be a specially formatted message that is sent from a first database management system to a second database management system. The request to transfer may be sent from the first database management system to the second database management system over a transfer rail that is used for facilitating transfers between databases associated with different database management systems. For example, the first database management system may be associated with a first database and the second database management system may be associated with a second database. The databases may store account data. That is, the databases may store data that is associated with various accounts. In at least some implementations, each record in the database may be associated with a particular one of these accounts.

A request to transfer is a message that is sent on behalf of a recipient to initiate a transfer from a sender to the recipient. That is, the request to transfer is sent, on behalf of the recipient, from the database management system associated with the recipient to the database management system associated with the sender. The request to transfer requests a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the database management system associated with the sender and/or that identify the database management system associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

A record of the transfer event may be stored in a data store by storing the transfer message, or portions thereof, in a computing event object 604 of the data store 600 of FIG. 6.

In operation 704, the computing system may identify, from a plurality of computing events, a set of computing events corresponding to a computing event category. This may involve performing a search on the plurality of computing events for computing events that fall within the computing event category. The plurality of computing events may be a history of computing events associated with a particular account associated with the computer system. In some embodiments, the plurality of computing events may correspond to computing events that occurred in a defined period of time.

The plurality of computing events may be historical computing events that occurred internal to the computing system and/or external to the computing system. In some embodiments, the plurality of computing events include computing events corresponding to computing event data retrieved from one or more external or third-party transfer processing systems on which transfers may have been processed.

In some embodiments, the computing event category represents charitable transfer events, and the set of computing events may be transfer events that represent charitable contributions.

The identification of the set of computing events may involve identifying a first category of each of the plurality of computing events. A first category of a computing event may be identified by retrieving a category identifier from stored data corresponding to or identifying the computing event. In some embodiments, the first category may correspond a recipient identifier stored in a computing event object.

The computer system may then match the first category for the computing event with a category identifier in a list of categories maintained by a third-party server, which may be a categorization server 170 of FIG. 1. For example, if the computing event includes a transfer event, the computer system may match the recipient identifier for the transfer event with a charity identifier in a list of supported charities maintained by a government server. If there is a match, then the computing event is included in the set of computing events. Otherwise, the computing event is excluded from the set of computing events.

In this way, the computer system may, in operation 706, identify a respective first category of each particular computing event in the set of computing events and, in operation 708, determine that each respective first category matches with a respective category defined in a list of categories maintained by a third-party server.

In some embodiments, determining that a particular first category of a computing event matches a category in the list of categories may include transmitting, based on the first category identifier (e.g. recipient identifier), a query to the categorization server. The categorization may then determine whether the first category identifier is included in the list of categories maintained by the categorization server and return a reply indicating the result of the determination.

In some embodiments, determining that a particular first category of a computing event matches a category in the list of categories may include downloading, from the third-party server, a bulk data file including the list of categories and storing the bulk data file in a data store. The computing system may then use the stored bulk data file in the determination of whether there is a match. In some embodiments, the bulk data file may include a list of categories and corresponding system identifiers, and may be in stored in the categories object 606 of the data store 600 of FIG. 6. The bulk data file may be a delimited data file such as a common separated value (CSV) data file and/or may be a spreadsheet data file.

In operation 710, when a computing event is identified as corresponding to the computing event category, the computing event may be tagged. For example, in some embodiments, the computing event may be tagged as a charitable transaction. The tag may be referenced in future queries to quickly identify the computing event category of a particular computing event.

In operation 712, the computing system may retrieve a respective representation of one or more computing events in the set of computing events. In some embodiments, the representation may be retrieved from a system, sometimes be referred to as a representation server, which may be of the type described herein. In some embodiments, the representation may be retrieved from the representation servers 190 of FIG. 1. The representation server may be an external or third-party computing system associated with the computing event; however, the computing event may have occurred on a system separate and distinct from the representation server. For example, in some embodiments, where the computing event identifies a transfer, the representation server may be managed by the recipient of a transfer. In some embodiments, the computing system retrieves a respective representation of each particular computing event in the set of computing events.

The computing system may store a directory of categories of computing events that map to representation servers. The directory may be used by the computing system to retrieve the representation of the computing event. For instance, a first category may map to an identifier of a representation server (e.g. an Internet Protocol (IP) address or domain name of the representation server) at which representations corresponding to the first category are stored. When the computing system identifies a first category as being included in the list of categories, the computing system may use the first category to lookup the representation server identifier.

In some embodiments, each of the representation servers provides a respective retrieval application programming interface (API). The computing system may retrieve the representation of the computing event by identifying, from amongst a plurality of application programming interfaces, an application programming interface capable of retrieving the representation and using the identified application programming interface to retrieve the representation. The identification of the application programming interface may be based on a category of the computing event. In some embodiments, the identification of the application programming interface may be based on a recipient identifier.

In some embodiments, the identified application programming interface may utilize a particular messaging protocol (e.g., a Representation State Transfer (REST) API (RESTful API) or a Simple Object Access Protocol (SOAP) API). Retrieving the representation may include generating a message in conformity with the particular messaging protocol for invoking the identified application programming interface.

The representation of the computing event may be or include file or electronic document. The representation may be in a document format such as, for example, Portable Document Format (PDF) file or a media format such as, for example, Joint Photographic Experts Group (JPEG or JPG).

Example parameters that may be included in an electronic document include an identifier identifying the particular computing event and a category identifier.

The electronic document may represent a transfer and be a receipt for the transfer. In some embodiments, the representation may be a charitable receipt. Where the electronic document represents a transfer, the parameters may include: a date on which the transfer occurred; an amount of resources transferred; identification information of the first and/or second account holders (e.g. full name, postal address, contact details, telephone number, email address, alias); and routing data, which may include identification information of the first and/or second system and/or the entity associated with, operating or managing the first and/or second system (e.g. a routing number, financial institution identifier, and/or branch transit number associated with the first and/or second system) and/or identification information of a first and/or second logical storage area, for example, a logical storage area identifier (e.g. bank account number), associated with, managed or controlled by a respective first and/or second account holder to or from which the amount of resources is to be transferred. The parameters may be or include numeric and/or alphanumeric values.

In operation 716, the computing system calculates, based on the set of computing events, a metric. The metric may be, for example, a total sum of transfers of value corresponding to the set of computing events, or an estimated tax credit associated with such contributions. In some embodiments, the metric is calculated based on particular computing events in the set of computing events that occur during a defined period of time. The defined period of time may be year, such as, for example, a calendar year or fiscal year.

In this way, the computing system may retrieve representations that are to be used to respond to future search queries.

In operation 716, the computing system transmits, to a computing device associated with a second category of a particular computing event of the set of computing events, a graphical user interface providing access to representations of computing events in the set of computing events. The second category of the particular computing event may correspond to an identifier stored in data corresponding to the particular computing event. For example, the second category may correspond to a transferor identifier stored in a computing event object.

Transmitting the graphical user interface may include the providing, to the client device, a query interface for accepting input and query parameters for identifying computing events and/or retrieving representations of computing events, and an access interface for receiving input and providing access to representations of computing events. The query interface and access interface may be input interfaces and/or graphical user interfaces.

Figure 9:
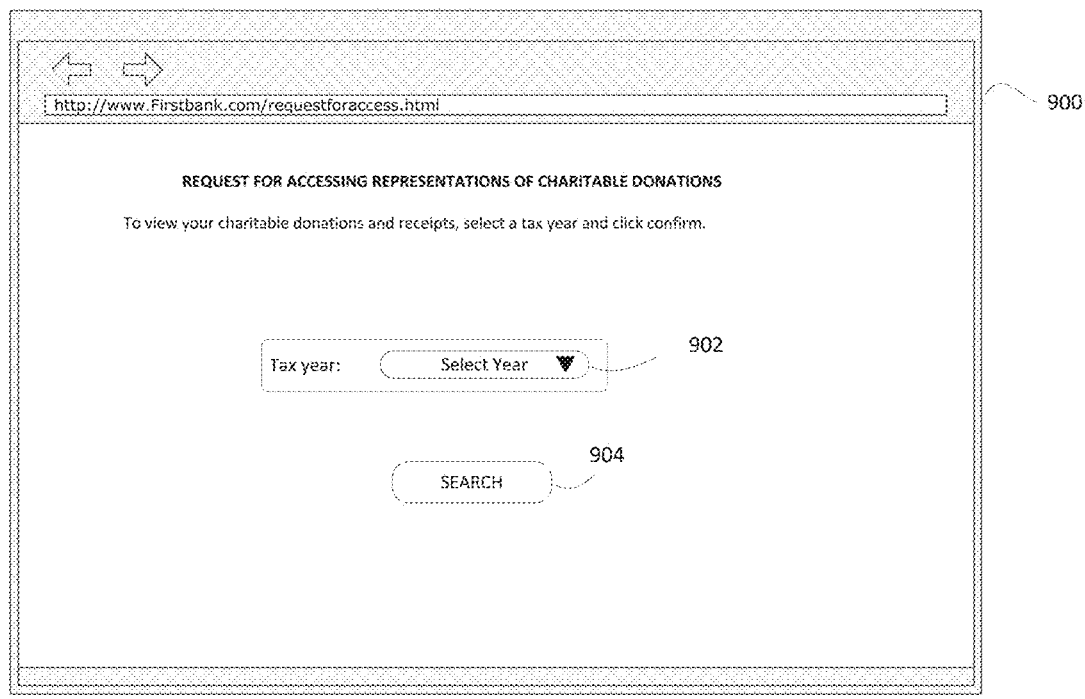
FIG. 9 is an example interface prompting for the selection of a time period.

Referring briefly to FIG. 9, an example query interface 900 is illustrated. The query interface 900 may be provided by the computing system to a client device. The client device may correspond to a client device 110 of FIG. 1. The query interface 900 may display user selectable options of parameters to be used in performing a searching for representations of computing events. As shown, the query interface 900 includes a selectable option element 902 that prompts for the selection of a defined period of time. In some embodiments, the selectable options include a calendar or fiscal year prior to a current calendar or fiscal year. Actuating the search element 904 may cause the client device to transmit a query instruction to the computing system.

Referring back to FIG. 7, the computing system may receive, from the client device, a query instruction. The query instruction may include of query parameters. The query parameters may include an indication of a selection of a particular period of time. In response to receiving the query instruction, the computer system may retrieve from storage representations of the set of computing events corresponding to the selected period of time.

Figure 10:
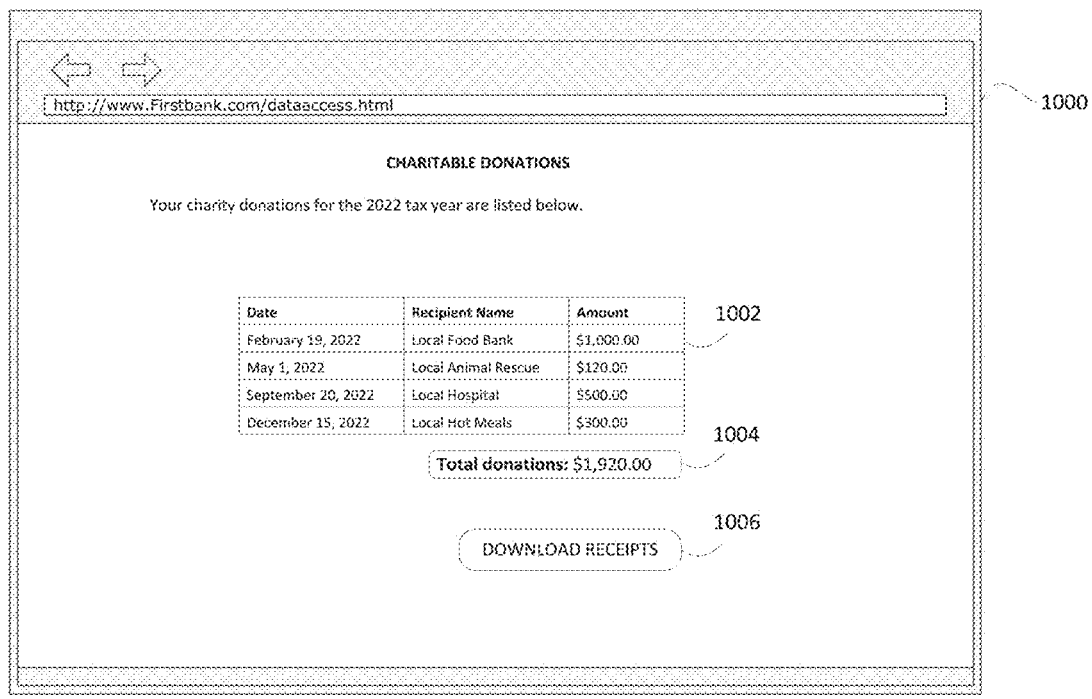
FIG. 10 is an example access interface for providing access to representations of computing events.

Referring briefly to FIG. 10, an example access 1000 for providing access to representations of computing events is illustrated. The access interface 1000 may include a table 1002 including data corresponding to the retrieved set of computing events. The access interface 1000 may also include the metric element 1004 which shows a metric calculated in operation 714 of the method 700 of FIG. 7. As shown, the metric is a sum of the charitable donations made in 2022 by an account holder.

The access interface 1000 further includes a download element 1006 for downloading, from the computing system, representations of computing events. The download element 1006 may be referred to as a user interface element. In at least some embodiments, a user interface element may be invoked, actuated or otherwise selected by a user. Selection of a user interface element can include conventional user input operation on the user interface element so as to provide a signal or instruction to a browser application or other executing application that a selection of the user interface element has been made by the user and/or that a particular action represented by the user interface element is to be carried out. Different forms of selection, for example, by a touch, gesture, pointing device, or voice command, will be known to those skilled in the art. In some cases, a command, action, or operation associated with the user interface element can be invoked as a result of user input selecting or otherwise acting on a user interface element.

Referring back to FIG. 7, in response to selection of the download element 1006, the computing system may receive, from the client device, an instruction to transmit the representations of the computing events to the client device.

In operation 718, in response, the computing system may transmit, to the client device, a representation of each particular computing event in the set of computing events. In some embodiments, the computing system may package the representations in a file in an archive format (such as zip or tar) and transmit the archive file, or may combine the representations into a single PDF file and transmit the PDF file.

The query interface 900 and access interface 1000 may, in at least some embodiments, be provided to and received by the client device after the computing system has established an authenticated session with the client device. An authenticated session may include a session in which the identity of an account holder is verified by the source system through receiving and authenticating account holder credentials. The account holder account credentials may include a user name and password combination, biometric information, or other credential data. In some embodiments, establishing an authenticated session may involve the computing system providing to the client device an authentication interface that prompts the user to sign in to the computing system with credentials. The computing system may receive credentials via the authentication user interface to establish an authenticated session with the client device. That is, the client device uses a credential to confirm that it is associated with a particular account-holder, who may be referred to as an authenticated entity after successful authentication. In some embodiments, the client device may authenticate itself as being associated with a user account that is associated with a transferor. In this way, the representations that are accessible to the authenticated entity may be only those that correspond to computing events associated with the user account. For example, in some embodiments, the authenticated user may be able to access those charity receipts where the donor is the authenticated user.

It will be appreciated that the method 700 of FIG. 7 as described may be modified. For example, the access interface may be modified to facilitate the download of one or more of the representations of computing events. As another example, one or more operations 704, 706, 708, 710, 712, 714 of the method 700 of FIG. 7 may be performed in response to receiving a query instruction via the query interface, or may be performed on a periodic basis, such as annually or after a calendar year or a fiscal year associated with the user account. In some embodiments, upon performing the one or more periodic operations, a notification may be provided to the client device indicating that representations, corresponding to computing events occurring in the previous calendar or fiscal year associated with the account, are accessible via the computing system.

Figure 8:
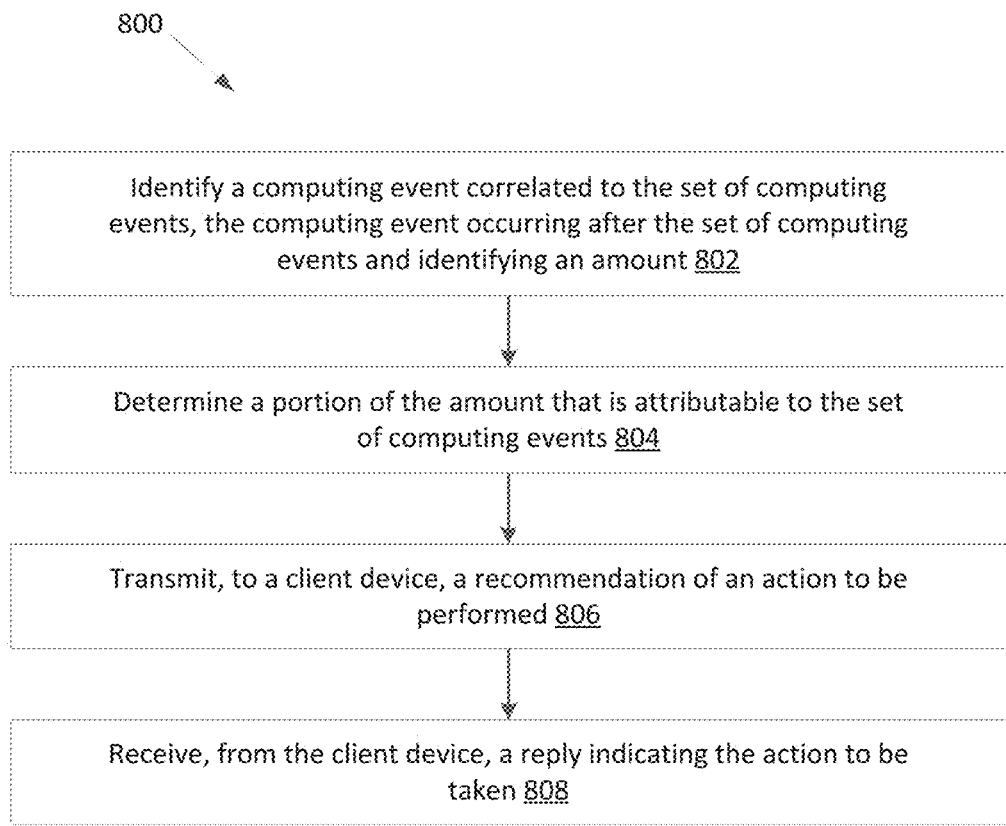
FIG. 8 is another flowchart showing operations performed in providing a recommendation of an action to be performed in connection with a set of computing events, according to an example embodiment.

Reference will now be made to FIG. 8 which illustrates an example method 800 for providing a recommendation of an action to be performed in connection with a set of computing events. The operations of the example method 800 may be performed by a computer system which may be of the type described herein. In some embodiments, the operations may be performed by a first computing system 130 of FIG. 1.

In operation 802, the computing system may identify a computing event correlated to or associated with the set of computing events. The set of computing events may be the set of computing events identified in the method 700 of FIG. 7. The computing event may be a computing event occurring after the set of computing events.

In some embodiments, the identification of the computing event correlated to or associated with the set of computing events may be based on the timing of the computing event and the set of computing events, a category of the set of computing events, and/or an identifier associated with the computing event. For example, a computing event may be identified as correlated to or associated with the set of computing events if the computing event occurs in a current year, the set of computing events occurred in the previous year, the category of the set of computing events is associated with charitable donations, and a transfer request associated with the computing event identifies a transfer of an expended tax refund.

The computing event may identify or correspond to an amount. In some embodiments, the amount represents an amount of an expended tax refund.

In operation 804, the computing system may determine a portion of the amount that is attributable to the set of computing events. The determination may be based on the metric (e.g. total donations) calculated in the method 700 of FIG. 7, defined rules (e.g. income tax rules), and account information (e.g. address/residency information). In some embodiments, the determination may be based on additional information that is accessible to the computing system, such as, for example, a marginal tax rate, total taxable income, or a tax return.

In operation 806, the computing system may provide to a client device a recommendation of an action to be performed. The recommendation may indicate the determined portion of the amount. In some embodiments, the computer system may transmit the recommendation to a client device and present the recommendation to a user of the client device via a user interface. The user interface may be that of a messaging application, such as an email application, text and/or voice message application, or instant message application. In some embodiments, the user interface may be a graphical user interface that presents the recommendation via pop-up, alert, or in any other suitable manner.

The recommendation may be provided in real time or near real time via the communications module. For example, the recommendation may be provided to the client device as a notification immediately after identifying the computing event and/or determining the amount.

In some embodiments, the recommendation and user interface may provide one or more user selectable options for responding to the recommendation and prompt for user input selecting an option. The selectable options may be presented as a link, button or other actionable user interface element and may include text. The text may include the name of an entity associated with a source system. In some embodiments, the selectable options may provide a handling instruction for handling the portion of the amount (e.g. tax refund) attributable to the set of computing events.

The selection offered through the recommendation and/or user interface may be to select an action to be performed. In particular, the selection offered may be to select: a further charitable contribution, for example, to the user's most preferred charity; a purchase to be made with the portion of a refund attributable to the charitable contributions; and/or a savings product for the portion of the refund attributable to the charitable contributions.

Figure 11:
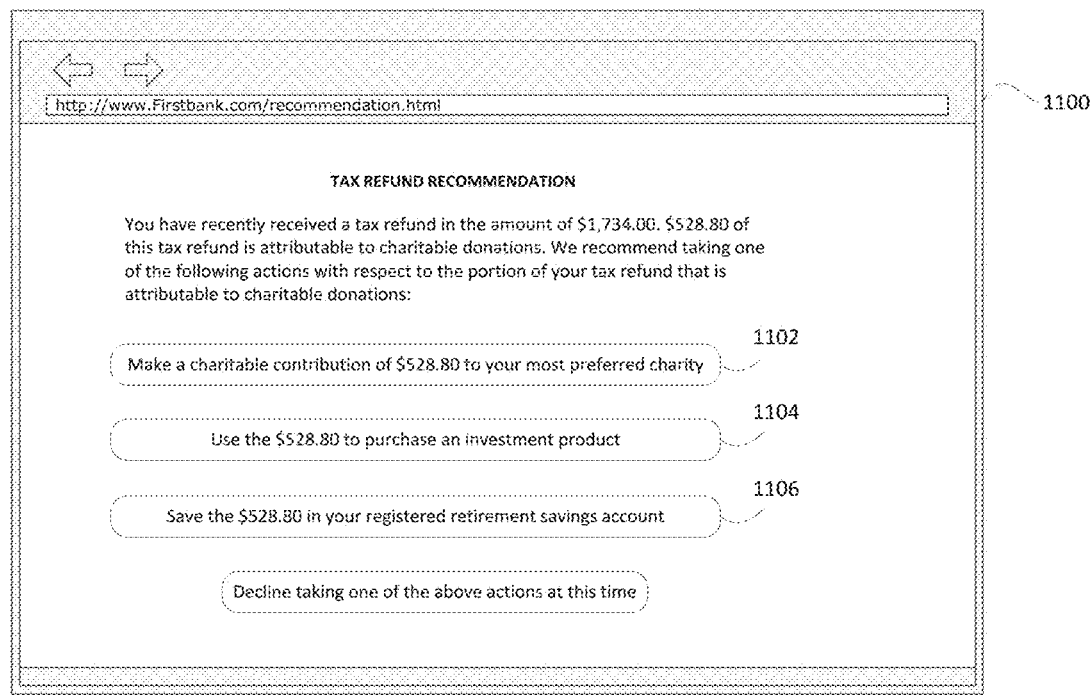
FIG. 11 is an example recommendation interface for providing a recommendation of an action to be performed in connection with a computing event.

Referring briefly to FIG. 11, an example recommendation interface 1100 is illustrated. In some embodiments, the recommendation interface 1100 may be included in the access interface 1000 of FIG. 10.

The recommendation interface 1100 includes selectable options 1102, 1104 and 1106 for selecting an action to be performed. For example, the selectable options 1102, 1104 and 1106 may be displayed and used for performing a data transfer and may be activated in order to trigger the computing system to configure and process a data transfer for value.

The selectable options 1102, 1104 and 1106 may be associated with a reference or uniform resource identifier (URI) that links to the computing system. In other words, the selectable options 1102, 1104 and 1106 may be links for launching user interfaces provided by the computing system. For example, the first selectable option 1102 may be invoked to launch a payment graphical user interface for making a payment to a charity. The second selectable option 1104 may be invoked to launch a payment graphical user interface for making a purchase. The third selectable option 1106 may be invoked to automatically perform a data transfer in real-time.

The recommendation interface 1100 may, in at least some embodiments, be provided to and received by the client device after the computing system has established an authenticated session with the client device. An authenticated session may include a session in which the identity of an account holder is verified by the source system through receiving and authenticating account holder credentials. The account holder account credentials may include a user name and password combination, biometric information, or other credential data. In some embodiments, establishing an authenticated session may involve the computing system providing to the client device an authentication interface that prompts the user to sign in to the computing system with credentials. The computing system may receive credentials via the authentication user interface to establish an authenticated session with the client device. That is, the client device uses a credential to confirm that it is associated with a particular account-holder, who may be referred to as an authenticated entity after successful authentication. In some embodiments, the client device may authenticate itself as being associated with a user account that is associated with a transferor.

Referring back to FIG. 8, in operation 808, the computing system may receive, from the client device, the handling instruction, which may include an instruction to process a transfer of the portion of the amount attributable to the set of computing events. In response, the computing system may process the handling instruction and, if so instructed, the transfer.

It will be appreciated that it may be that some or all of the above-described operations of the various above-described example methods may be performed in orders other than those illustrated and/or may be performed concurrently without varying the overall operation of those methods.

It will also be appreciated that some or all of the above-described operations of the various above-described example methods may be triggered by, or caused by, or performed in response to, one or more of the above-described operations, and may be performed in real-time.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
a communications module;
a processor coupled to the communications module; and
a memory coupled to the processor and storing instructions that, when executed by the computer system, cause the computer system to:
process, using a transfer processing module included in the computer system, a transfer;
perform a search on a plurality of computing events to identify, from the plurality of computing events, a set of computing events corresponding to a computing event category and including a transfer computing event internal to the computer system and corresponding to the use of the transfer processing module to process the transfer, the identification of the set of computing events including:
identifying a respective first category of each particular computing event in the set of computing events; and
querying a remote third-party categorization server to determine that each respective first category matches with a respective category defined in a list of categories maintained by the remote third-party categorization server;
look up, based on a result of the search to identify the set of computing events, one or more system identifiers identifying one or more external third-party representation systems and corresponding to each respective first category;
identify one or more application programming interfaces capable of retrieving representations of computing events in the set of computing events from the one or more external third-party representation systems;
use the one or more application programming interfaces and the one or more system identifiers to route messages to the one or more external third-party representation systems to retrieve, at the one or more application programming interfaces and via the communications module and from the one or more external third-party representation systems, representations of computing events in the set of computing events including a representation of the transfer computing event;
transmit, via the communications module and to a computing device associated with a second category of a particular computing event of the set of computing events, a graphical input interface providing access to the representations of computing events in the set of computing events including the representation of the transfer computing event; and
responsive to an instruction received via the graphical input interface, download the representation of the transfer computing event to the computing device.

2. The computer system of claim 1, wherein the instructions, when executed by the computer system, further cause the computer system to:
identify a computing event correlated to the set of computing events, the computing event occurring after the set of computing events; and
in response to identifying the computing event, transmit a recommendation of an action to be performed.

3. The computer system of claim 1, wherein the instructions, when executed by the computer system, further cause the computer system to:
identify a computing event associated with the set of computing events, the computing event occurring after the set of computing events and identifying an amount;
determine a portion of the amount attributable to the set of computing events; and
provide on the interface a selectable option to provide a handling instruction for handling the portion of the amount attributable to the set of computing events.

4. The computer system of claim 3, wherein the handling instruction includes an instruction to perform a data transfer to an entity defined by a category in the list of categories.

5. The computer system of claim 1, wherein the instructions, when executed by the computer system, further cause the computer system to retrieve a representation of a computing event of the set of computing events from an external system associated with the computing event.

6. The computer system of claim 1, wherein the plurality of computing events include computing events that occur on a computing system distinct from the computer system.

7. The computer system of claim 1, wherein the instructions, when executed by the computer system, further cause the computer system to transmit, to the computing device, an interface including a selectable option to retrieve representations of computing events corresponding to the computing event category over a defined period of time.

8. The computer system of claim 7, wherein the defined period is a calendar or fiscal year prior to a current calendar or fiscal year.

9. The computer system of claim 1, wherein the instructions, when executed by the computer system, further cause the computer system to:
calculate, based on the set of computing events and a defined period of time, a metric; and
include the metric in the interface.

10. The computer system of claim 1, wherein identifying the set of computing events includes downloading, from the third-party server, a bulk data file including the list of categories.

11. The computer system of claim 1, wherein determining that each respective first category matches with the respective category defined in the list of categories maintained by the third-party server includes using an application programming interface to query the third-party server.

12. The computer system of claim 1, wherein the set of computing events include an action taken by the computing system.

13. The computer system of claim 1, wherein the set of computing events include a data transfer event.

14. The computer system of claim 1, wherein the list of categories includes a list of entities.

15. A computer-implemented method, the method comprising:
processing, using a transfer processing module included in a computer system, a transfer;
performing a search on a plurality of computing events to identify, by the computer system and from the plurality of computing events, a set of computing events corresponding to a computing event category and including a transfer computing event internal to the computer system and corresponding to the use of the transfer processing module to process the transfer, the identification of the set of computing events including:
identifying a respective first category of each particular computing event in the set of computing events; and
querying a remote third-party categorization server to determine that each respective first category matches with a respective category defined in a list of categories maintained by the remote third-party categorization server;
looking up, based on a result of the search to identify the set of computing events, one or more system identifiers identifying one or more external third-party representation systems and corresponding to each respective first category;
identifying one or more application programming interfaces capable of retrieving representations of computing events in the set of computing events from the one or more external third-party representation systems;
using the one or more application programming interfaces and the one or more system identifiers to route messages to the one or more external third-party representation systems to retrieve, by the computer system at one or more application programming interfaces and via the communications module and from one or more external representation systems, representations of computing events in the set of computing events including a representation of the transfer computing event;
transmitting, by the computer system and to a computing device associated with a second category of a particular computing event of the set of computing events, a graphical input interface providing access to representations of computing events in the set of computing events including the representation of the transfer computing event; and
responsive to an instruction received via the graphical input interface, downloading the representation of the transfer computing event to the computing device.

16. The method of claim 15, further comprising:
identifying a computing event correlated to the set of computing events, the computing event occurring after the set of computing events; and
in response to identifying the computing event, transmitting a recommendation of an action to be performed.

17. The method of claim 15, further comprising:
identifying a computing event associated with the set of computing events, the computing event occurring after the set of computing events and identifying an amount;
determining a portion of the amount attributable to the set of computing events; and
providing on the interface a selectable option to provide a handling instruction for handling the portion of the amount attributable to the set of computing events.

18. The method of claim 17, wherein the handling instruction includes an instruction to perform a data transfer to an entity defined by a category in the list of categories.

19. The method of claim 15, wherein the plurality of computing events include computing events that occurred on a plurality of computing systems.

20. A non-transitory computer-readable storage medium comprising processor-executable instructions which, when executed, configure a processor to:
process, using a transfer processing module included in a computer system, a transfer;

perform a search on a plurality of computing events to identify, from the plurality of computing events, a set of computing events corresponding to a computing event category and including a transfer computing event internal to the computer system and corresponding to the use of the transfer processing module to process the transfer, the identification of the set of computing events including:
   identifying a respective first category of each particular computing event in the set of computing events; and
   querying a remote third-party categorization server to determine that each respective first category matches with a respective category defined in a list of categories maintained by the remote third-party categorization server;
look up, based on a result of the search to identify the set of computing events, one or more system identifiers identifying one or more external third-party representation systems and corresponding to each respective first category;
identify one or more application programming interfaces capable of retrieving representations of computing events in the set of computing events from the one or more external third-party representation systems;
use the one or more application programming interfaces and the one or more system identifiers to route messages to the one or more external third-party representation systems to retrieve, at the one or more application programming interfaces and via the communications module and from the one or more external third-party representation systems, representations of computing events in the set of computing events including a representation of the transfer computing event;
transmit, to a computing device associated with a second category of a particular computing event of the set of computing events, a graphical input interface providing access to representations of computing events in the set of computing events including the representation of the transfer computing event; and
responsive to an instruction received via the graphical input interface, download the representation of the transfer computing event to the computing device.

\* \* \* \* \*